A. McPHAIL.
MACHINE FOR MANUFACTURING SPIRAL COMBINED REINFORCEMENT AND FASTENING.
APPLICATION FILED JAN. 22, 1919.
1,352,904.                                         Patented Sept. 14, 1920.
6 SHEETS—SHEET 4.
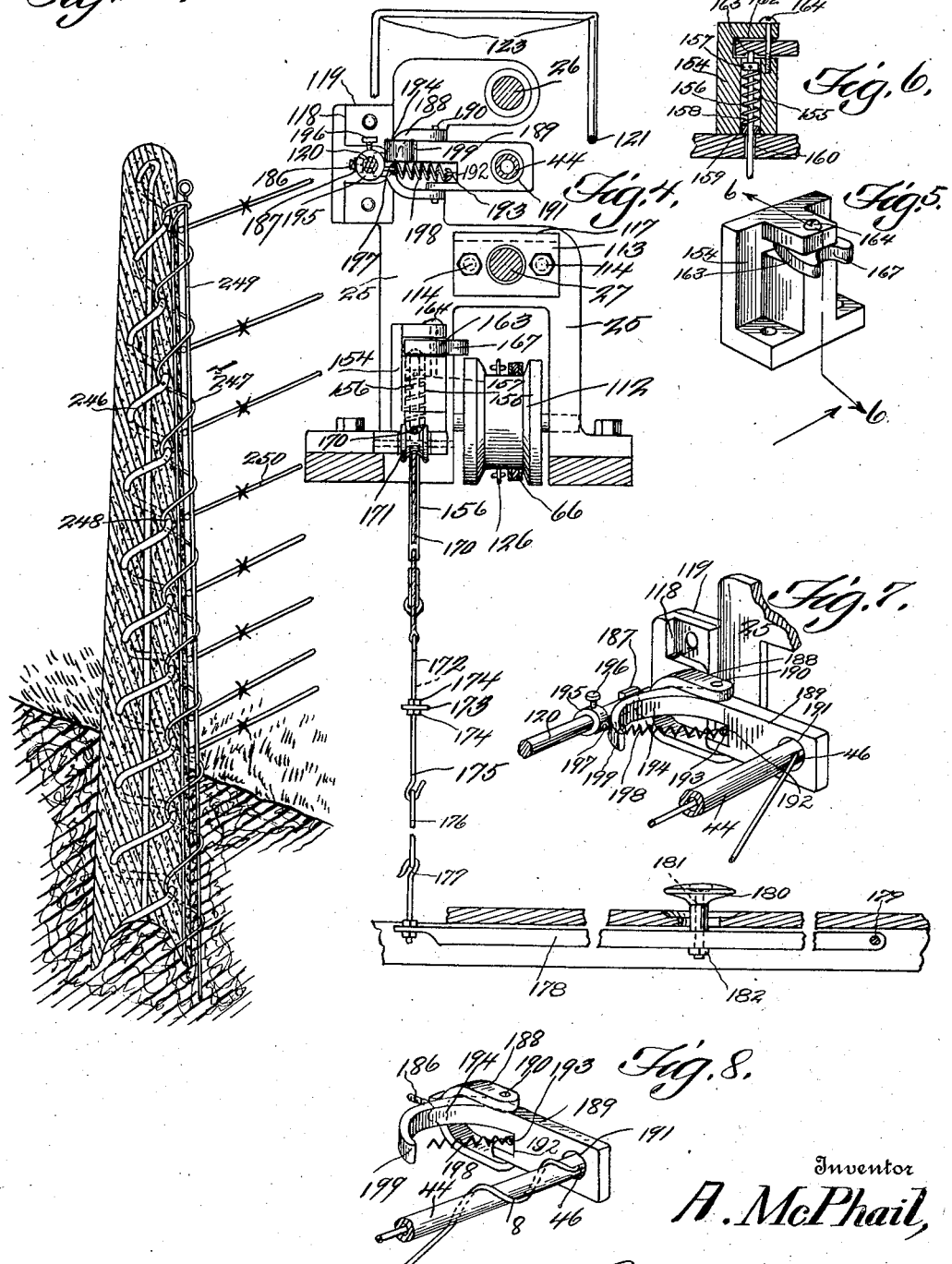

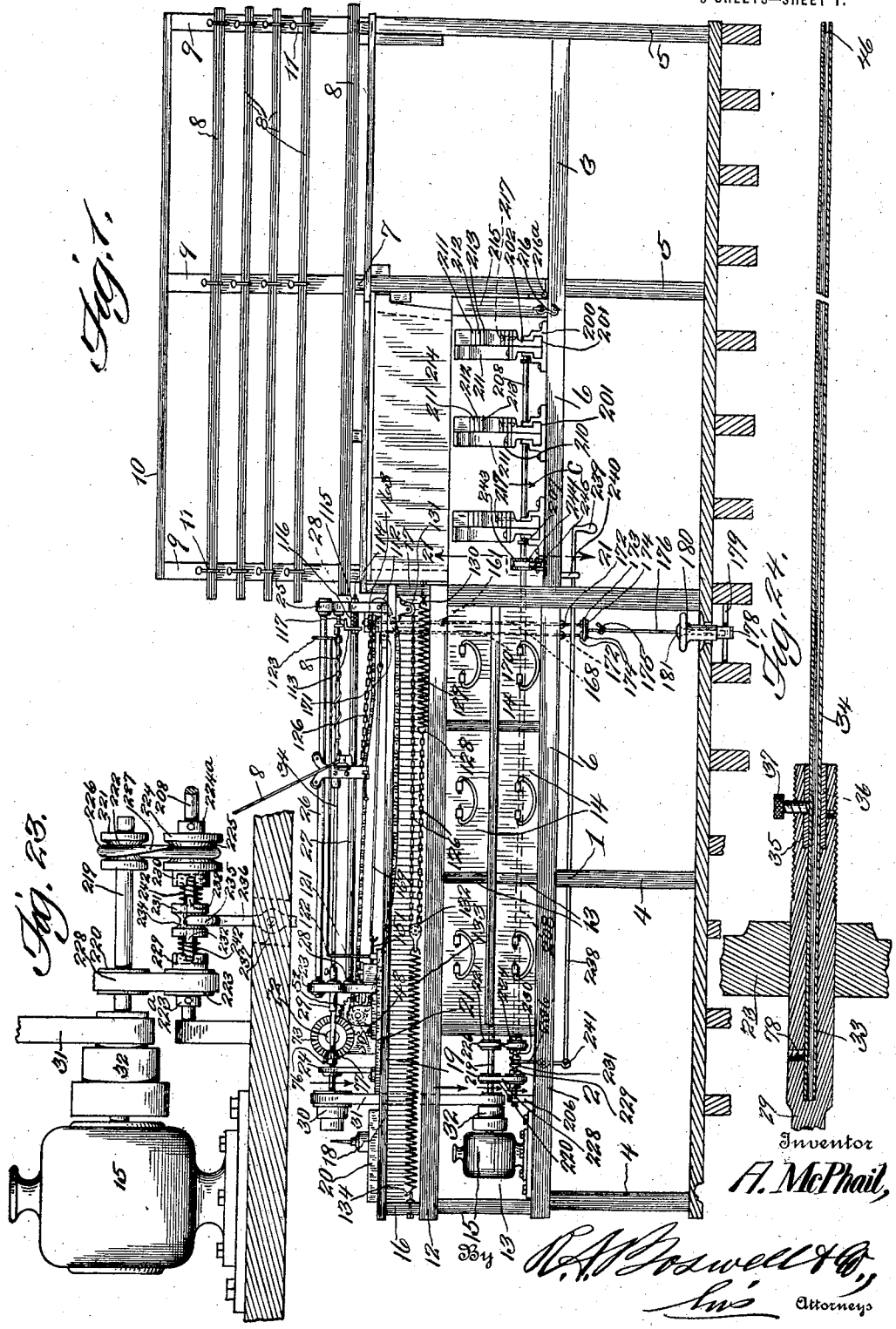

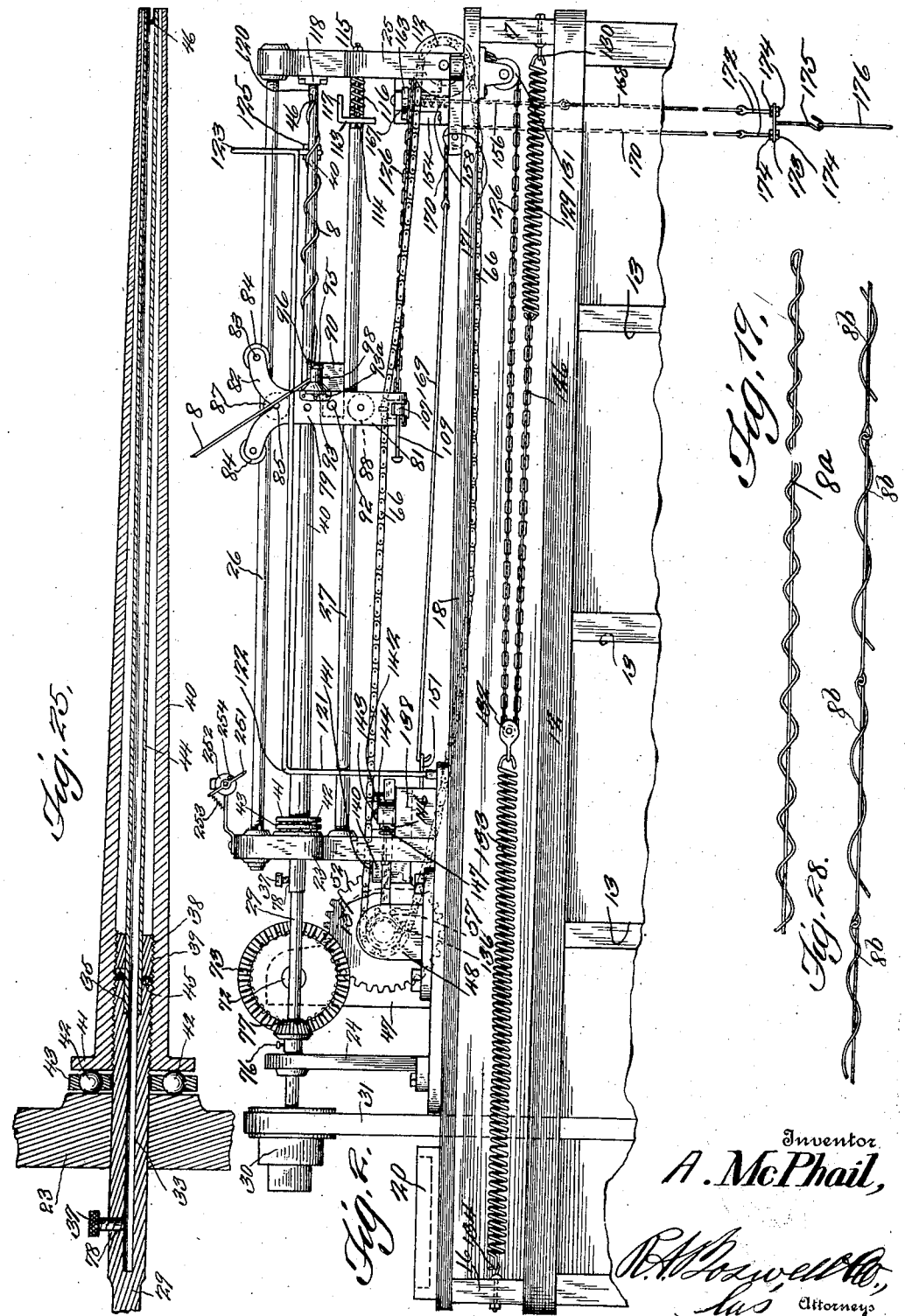

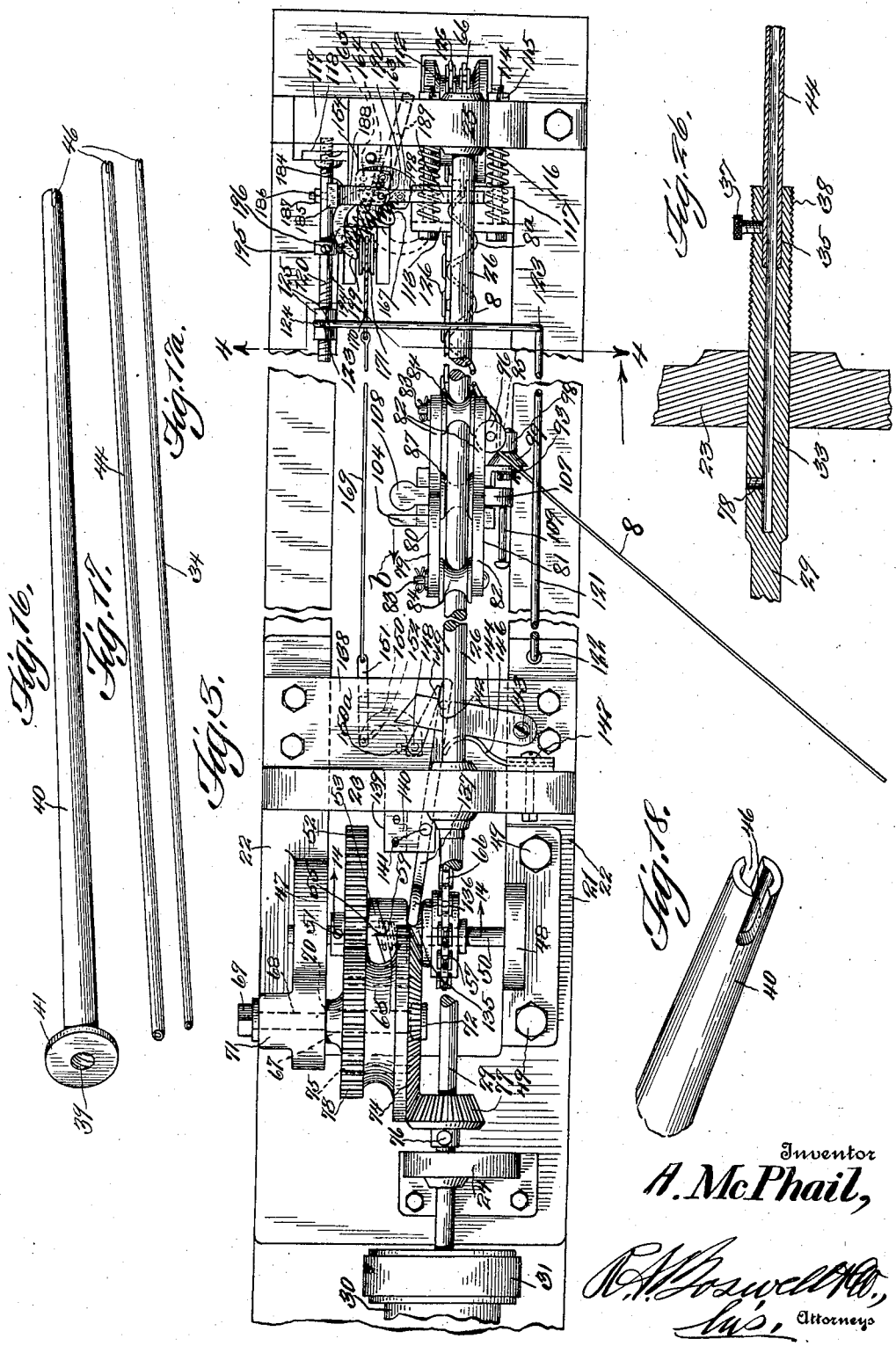

A. McPHAIL.
MACHINE FOR MANUFACTURING SPIRAL COMBINED REINFORCEMENT AND FASTENING.
APPLICATION FILED JAN. 22, 1919.
1,352,904.
Patented Sept. 14, 1920.
6 SHEETS—SHEET 5.
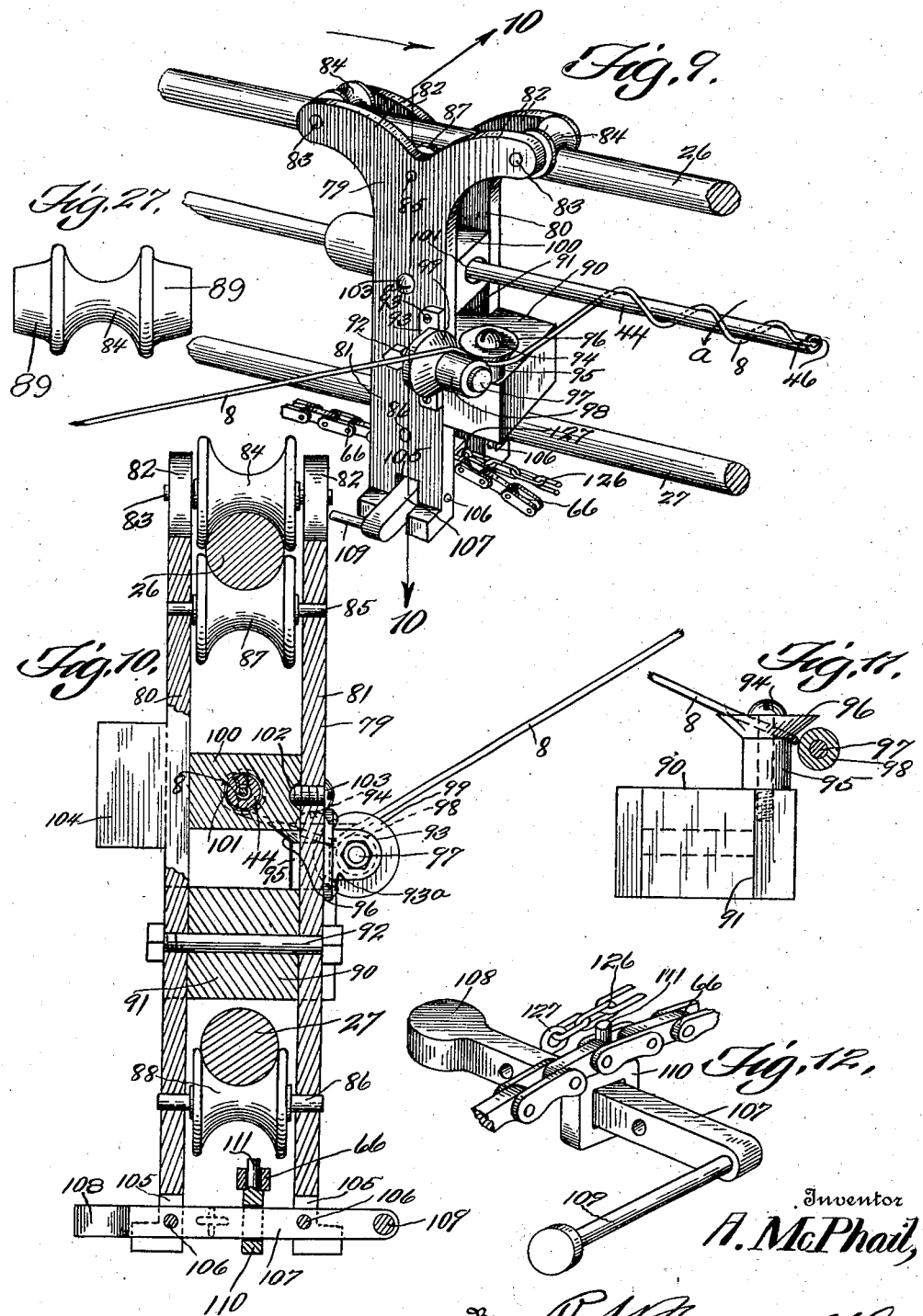

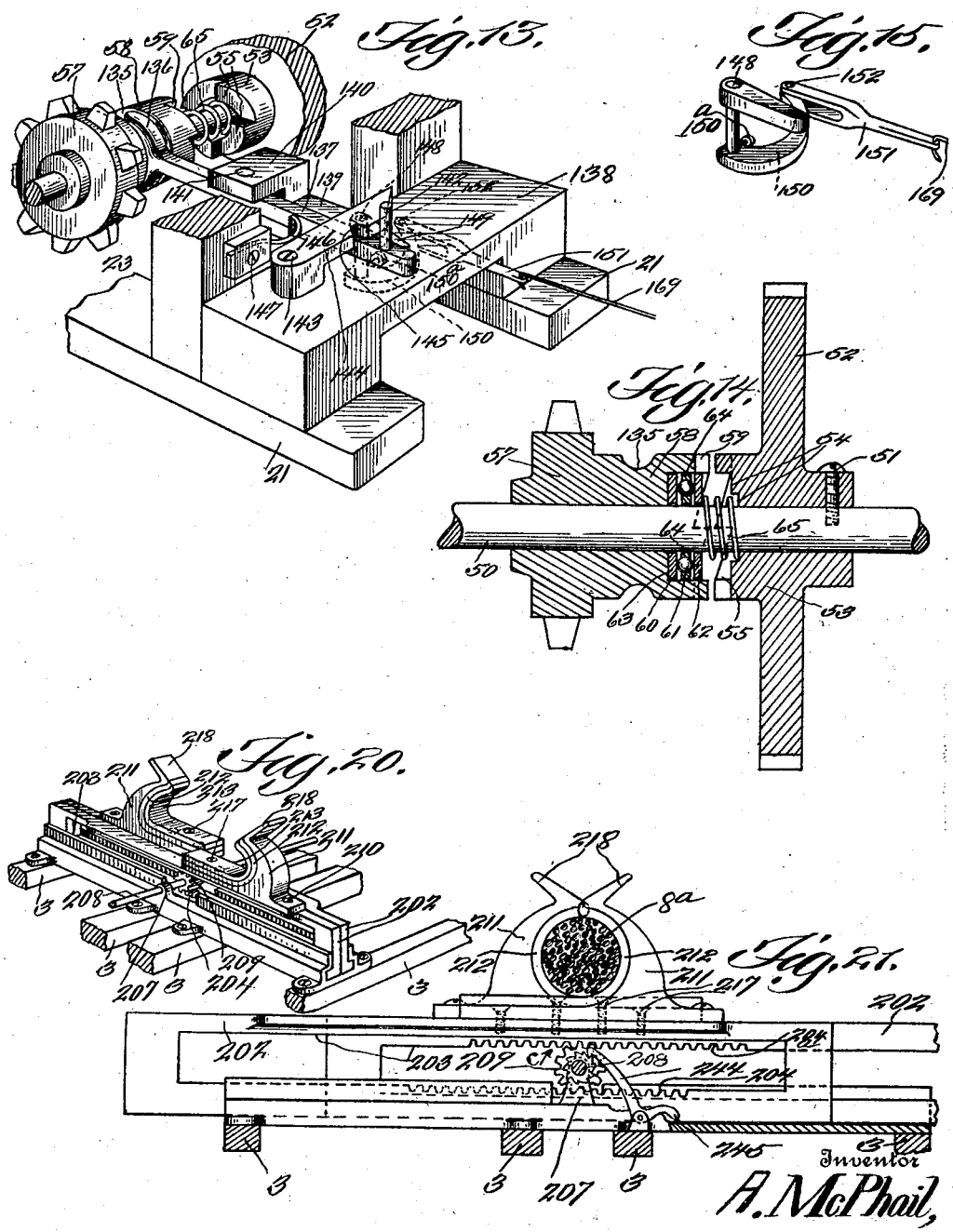

UNITED STATES PATENT OFFICE.

ARCHIBALD McPHAIL, OF FARGO, NORTH DAKOTA, ASSIGNOR TO STERLING MACHINE AND WIRE WORKS, BENEFICIAL TRUST ASSOCIATION (UNINCORPORATED), OF STERLING, ILLINOIS.

MACHINE FOR MANUFACTURING COMBINED SPIRAL REINFORCEMENT AND FASTENING.

1,352,904.  Specification of Letters Patent.  Patented Sept. 14, 1920.

Application filed January 22, 1919. Serial No. 272,594.

*To all whom it may concern:*

Be it known that ARCHIBALD MCPHAIL, a citizen of the United States of America, residing at Fargo, in the county of Cass and State of North Dakota, has invented a new and useful Machine for Manufacturing Combined Spiral Reinforcements and Fastenings, of which the following is a specification.

This invention relates to the art of wire reinforcement for use in connection with cement fence posts and the like, and more especially to a new and improved machine for the manufacture of combined reinforcements and fence wire fastenings, such as illustrated in the drawings, described, and claimed in the copending application of A. McPhail, filed 22nd day of January, 1919, Serial No. 272,593.

The present invention aims to provide a machine of this kind, which is practical and simple in design and construction, and one which is automatic in operation, the various parts or elements being capable of coöperating coördinately, as well as positive in action.

The invention further aims to provide a machine for the manufacture of spiral helix reinforcement for fence posts, the helix being in surrounding relation and concentric with a central leg or portion and is connected integrally to one end of the leg and adapted to be disposed, whereby the parts are evenly arranged, so as to insure an even distribution of strength and rigidity.

A further object of the invention is to provide means, such as various needles of different diameters, either cylindrical or tapering, whereby spiral reinforcements may be constructed, the convolutions of which may be of uniform diameters, or of gradually increasing diameters, so as to provide a reinforcement helix which is tapered.

A further object of the invention is the provision of means for supporting the various types of needles.

A further object of the invention is to so construct a needle as to reduce the weight thereof and the material.

A further object of the invention is the provision of needles which may be telescopically united, whereby one may reinforce the other, and the provision of a rotating mandrel for supporting both needles in their telescopical relation.

The invention further aims to provide means for imparting a continuous revoluble movement to the mandrel, whereby the needle may be rotated, so that the reinforcement or helix may be formed on the outer surface thereof.

The invention further aims to provide an improved carriage for guiding the wire and retaining the same in its proper position whereby it may be coiled or formed in a spiral on the needle.

The invention further aims to provide means thrown into and out of engagement with the revoluble mandrel for intermittently feeding the carriage, which is mounted upon suitable guides.

A further object of the invention is the provision of means to be actuated by a member on the carriage for throwing the carriage operating means out of engagement with the mandrel-operating means, there being suitable means for returning the carriage to its initial position.

The present invention makes provision of means in the construction of the carriage to make it possible for guiding the various types of needles.

The invention further aims to provide means for absorbing the shock of the carriage on its return to its initial position, and the provision of detent means for holding the shock-absorbing means under tension, thereby preventing the recoil of the carriage.

The invention further aims to provide means for simultaneously actuating the carriage and the clutch detent mechanism, whereby the carriage may be released at the same time the clutch is thrown into operation.

The invention further aims to provide needle end retaining means, for holding the needle in true axial alinement with the mandrel, and to prevent vibration of the needle end during its revoluble movements.

Since the reinforcements are automatically and constantly formed by the machine, the invention makes provision of means for compacting the reinforcements in bundles, said means being actuated by and in gear with the motive power of the mandrel.

A further object of the invention is the provision of means for counting the reinforcements as they are constructed.

The invention is embodied in a structure which at present is deemed most preferable and practical, but which is not to be restricted. In practice various changes and alterations may be necessary, consequently the right to such changes and alterations that may be required, is claimed, provided they fall within the limits of the appended claims.

The invention comprises further features and combination of parts, as hereinafter set forth, illustrated in the drawings, and claimed.

In the drawings:—

Figure 1 is a view in side elevation of the entire machine for manufacturing combined reinforcements and fastenings.

Fig. 2 is an enlarged view in side elevation of the mechanism proper for constructing or forming the reinforcements.

Fig. 3 is a top plan view of Fig. 2, on an enlarged scale, showing a portion of the frame broken, so that the parts of the mechanism may be illustrated on a considerably larger scale.

Fig. 4 is a sectional view on line 4—4 of Fig. 3.

Fig. 5 is a detail perspective view of the carriage detent means.

Fig. 6 is a sectional view on line 6—6 of Fig. 5.

Fig. 7 is an enlarged detail perspective view of the needle end retaining means.

Fig. 8 is a detail view of the needle end retaining means, showing the guard or needle retainer proper in a different position.

Fig. 9 is an enlarged detail perspective view of the carriage.

Fig. 10 is a vertical sectional view on line 10—10 of Fig. 9.

Fig. 11 is a detail view of a bumper member and the wire guide which are carried on the carriage.

Fig. 12 is a detail perspective view of the connection between the carriage operating chain and a member on the carriage, which member coöperates with the carriage detent means.

Fig. 13 is an enlarged detail perspective view of the clutch mechanism for putting the carriage operating mechanism in gear with the mandrel, and illustrating the clutch detent means.

Fig. 14 is a sectional view on line 14—14 of Fig. 3, illustrating the clutch mechanism shown in Fig. 13.

Fig. 15 is a detail perspective view of a connection for actuating the clutch detent means.

Fig. 16 is a detail perspective view of the large needle for forming the large central reinforcement for the fence post.

Fig. 17 is a detail perspective view of an intermediate size of needle.

Fig. 17$^a$ is a detail perspective view of a smaller size of needle.

Fig. 18 is a detail perspective view of one end of the larger needle showing the diametrically oppositely disposed slots for preventing turning of the wire in the needle.

Fig. 19 is a detail view of one form of spiral reinforcement helix.

Fig. 20 is a detail perspective view of one pair of the bundle compacting jaws.

Fig. 21 is a sectional view on line 21—21 of Fig. 1 showing the bundle compacting mechanism showing the opposing jaws as having been operated.

Fig. 22 is an enlarged detail perspective view of a concrete fence post, showing the spiral reinforcement helix and fastening helix embedded therein.

Fig. 23 is a detail sectional view of the clutch mechanism between the loose pulleys of the operating shaft of the compacting mechanism.

Fig. 24 is an enlarged detail sectional view through a portion of the mandrel, showing the manner of connecting the smallest needle therein.

Fig. 25 is an enlarged detail sectional view of a portion of the mandrel, showing the smallest needle as having been removed, and illustrating the intermediate and larger needles connected to the mandrel.

Fig. 26 is an enlarged detail sectional view, showing the intermediate needle connected to the mandrel, the larger and smaller needles having been removed.

Fig. 27 is a detail view of a modified form of pulley 84, showing the bosses 89 on its opposite ends.

Fig. 28 is a view showing several sections of spirals connected, whereby a pinless clothes line may be afforded.

*Frame.*

The present invention embodies a conventional form of frame 1, which may be of any suitable construction or configuration, preferably as shown. In the present instance, this frame comprises the main section 2 and an auxiliary section 3. These sections consist of the upright portions 4 and 5, which are connected and reinforced by the longitudinally extending pieces 6. The section 3 has a superimposed part 7 for the support of the wires 8, from which the reinforcements and fastenings are formed or constructed. This superimposed portion of the section 3 has upright parts 9 connected at their upper ends by a longitudinal piece 10. The uprights 9 are provided with supporting hangers or nails 11 for the support of several groups of wires 8.

A portion of the superimposed part of the section 3 of the frame supports the compacting mechanism for the bundle of reinforcements, said mechanism to be described later. The section 2 of the frame has a superimposed portion 12, between which and the top of the lower portion of the section 2, several compartments 13 are formed, for the reception of drawers 14, which may contain various tools and additional parts, whereby the reinforcement forming mechanism may be repaired. One of the compartments 13 has a suitable electric motor 15 mounted therein, for furnishing power to the reinforcement construction mechanism.

*Reinforcing constructing mechanism frame.*

Mounted upon the section 2 of the frame 1 and superimposed in spaced relation by means of the end pieces 16 and 17 is a bed 18, which may be solid or open or skeleton in construction. By spacing the bed 18, a suitable elongated compartment 19 is provided for the reception of parts of said mechanism. One end of the bed has a rectangular flange 20, thereby providing a partitioned-off space which may contain small tools or waste and an oil-can or the like, for use in connection with the machine. Also mounted upon the bed is a plate 21, which is substantially U-shaped, as shown in top plan view in Fig. 3. Rising upwardly from the arms 22 of the plate 21 and cross-connecting the arms is an arched bracket 23. Also rising upwardly from the plate 21 on the end thereof opposite the bracket 23 and secured thereto is a second bracket 24. Rising upwardly from the bed 18 at its end remote from and opposite the bracket 23 is a U-shaped bracket 25. The brackets 23 and 25 have secured in bearings thereof suitable longitudinally extending parallel guide rods 26 and 27, which are superimposed, and are adapted for guiding a wire guide carriage toward and from its initial position during the formation or construction of the spiral reinforcements. These guide rods 26 and 27 may be mounted in said brackets 23 and 25 in any suitable manner, such as indicated at 28.

*Needle holding mandrel and operating mechanism therefor.*

Mounted in the bearings of the brackets 23 and 24 is a suitable shaft 29, which not only constitutes a driven shaft, but also acts as a mandrel for the needles which form the reinforcements. One end of the shaft 29 is provided with a suitable cone pulley 30 which is belted by means of the belt 31 to a cone pulley 32 on the shaft of the motor 15, whereby power may be transmitted to the shaft 29 and its mandrel end. One end of the shaft 29 is provided with a socket 33 for the reception of the smallest type of needle 34, on which the smallest size of spiral reinforcement is constructed or coiled. This socket 33 is counterbored to provide the bore 35 for the reception of a bushing 36. This bushing 36 is utilized, as shown in Fig. 24, when employing the smallest needle 34. The needle is inserted through the bushing and into the socket 33, there being a set screw 37 which is threaded through the wall of the socket end of the mandrel, and also through the bushing, and in contact with the needle, thereby holding the bushing and the needle securely in the bore 35. The exterior of the mandrel end of the shaft 29 is threaded, as shown at 38, to be engaged by the threads 39 of the largest tubular needle 40. This needle may be either tapered or cylindrical and is tubular and may be of any suitable diameter. One end of the tubular needle 40 has an annular flange 41, between which and the bracket 23 suitable ball bearings 42 are interposed. These ball bearings may be of any suitable construction, and may be retained in place by any conventional form of retaining plate or means 43. Obviously, the threads 38 and 39 are designed to be of such pitch and so formed that while the mandrel or shaft 29 is rotating in one direction, the threads will remain in constant engagement, in such wise as to prevent the needle 40 from unscrewing, the ball bearings acting to reduce the friction to a minimum. However, when using the larger needle 40, the bushing 36 is removed, and an intermediate tubular needle 44 is inserted in the bore 35, there being a countersunk set-screw 45 threaded through the wall of the mandrel and in contact with the needle 44. The smallest needle 34 is likewise tubular. These needles 34, 40 and 44, at their free ends, are provided with diametrically oppositely disposed slots 46. When forming a spiral reinforcement, or fastening or spiral stay, whether conical or tapered or the convolutions of uniform diameter, a wire of requisite length is inserted telescopically into the needle, until the inserted end contacts with the end of the socket 33 of the mandrel. The wire 8 is then bent, so as to engage either one of the slots 46, to prevent the wire from rotating in the needle. The wire is bent in the manner shown in Fig. 7, or Fig. 8. It is apparent that the various needles 34, 40 and 44 will form reinforcements or stays of different diameters. Further, additional needles of larger diameters may be employed, and, if so desired, the needle 40 may be used singly, that is without the intermediate needle 44. When using the intermediate needle singly, a reinforcement is constructed, the diameters of the convolutions of which are intermediate those of the smallest and larger reinforcements. However, when constructing the largest reinforcement, it is the aim of the present invention to utilize the intermediate needle 44, in order to lighten and reduce the material in the construction of the larger needle, as well as reinforcing or strengthening the larger needle. It is obvious, as hereinafter described, that the exposed portion of the wire 8 will coil in a spiral fashion about the exterior of the needle, as the mandrel rotates, and when the wire guiding carriage reaches the limit of its operating stroke, a complete fence post reinforcement spiral helix will be formed or constructed, and will be automatically discharged on the return of the carriage to its initial position. Rising upwardly from one of the arms of the plate 21 is a bearing bracket 47. An opposed bearing bracket 48 is bolted or otherwise secured at 49 to the other arm 22 of the plate 21. Mounted in the bearing brackets 47 and 48 is a shaft 50 to be driven. Fast upon the shaft 50 by means of the set screw 51 is a spur gear 52, the hub 53 of which may be of any suitable construction, preferably partially hollow, as indicated at 54. The marginal flange of the hollow 54 is formed with clutch teeth 55. The spur gear may be otherwise fastened or keyed to the shaft 50. Loose upon the shaft 50 is a sprocket 57, one face of which is provided with a clutch hub 58, having clutch teeth 59, adapted to coöperate with the clutch teeth 55 of the hub of the spur gear 52. Arranged in a hollow 60 of the clutch hub 58 are anti-frictional ball bearings 61 and anti-frictional circular plates 62 and 63, the ball bearings being intermediate the two plates. Suitable retaining rings 64 are provided for retaining the balls in their proper positions. Interposed between the plate 62 and the hollow of the hub 53 of the spur gear is a coiled spring 65, which holds the two clutch members normally separable. Since the shaft 50 is a driven shaft and the spur gear 52 is fast thereon, the sprocket 57, through the medium of the sprocket chain 66, will impart longitudinal movement to the carriage on its guide rods, as will hereinafter be set forth, when the clutch members are interengaged. The bearing bracket 47 also has mounted therein a stub shaft 67. This stub shaft has a reduced portion 68, which passes through the bearings in the bracket 47, and, by tightening up on the nut 69, the shoulder 70 of the stub shaft will be drawn tight against one face of the bracket 47, thereby holding the stub shaft firm. In order to provide a firm bearing for the reduced end of the stub shaft and to insure the rigidity thereof, that portion of the bracket through which the stub extends is enlarged, as shown at 71. However, this arrangement or construction may be varied as desired, in order to suit other conditions. The stub shaft 67 has a head 72, between which and one face of the bracket 47, spur and bevel gears 73 and 74 are loosely mounted. These gears are designed to rotate together and may be made, if so desired, in one piece, or separable and secured together by suitable screws 75, preferably the latter. Fast upon the shaft 29, by means of a set screw 76, is a bevel pinion 77, which meshes with the bevel gear 74. Obviously, when power is transmitted by the belt 31, the shaft 29 is rotated, imparting movement to the needle, and through the medium of the gears 52 and 73 (which intermesh) and the bevel gear 74 and pinion 77, power is transmitted to the shaft 50, and when the clutch connections of the gear 50 and the sprocket 47 are interengaged motion is imparted to the carriage. This motion is imparted instantly when the carriage starts its operating stroke. It might be said that when the smallest needle is dispensed with, whereby either one or both of the intermediate and larger needles may be used, the set-screw 37 is detached and threaded into the radial bore 78 of the mandrel end of the shaft 29.

*Guide and feed carriage for the wire.*

Mounted upon the guide rods 26 and 27 is a guide and feed wire for the reinforcement forming needle. This carriage 79 comprises the opposed plates 80 and 81, and may be of any suitable construction, preferably as shown. These plates, at their upper portions, are provided with laterally curved arms 82, in bearings of which suitable pins 83 are mounted. Journaled on the pins are grooved rollers or pulleys 84 which ride the upper guide rod 26. The grooves of these pulleys or rollers 84 are deep enough so that the flanges of the pulleys will engage considerably on either side of the guide rod, preferably almost one-half thereof, thereby insuring guiding of the carriage and preventing any lateral displacement or uncertainty of the proper position of the carriage. Also journaled in bearings of the plates 80 and 81 are the pins 85 and 86. Journaled upon the pin 85 is a grooved roller or pulley 87 identical in construction with the pulleys or rollers 84. This roller or pulley 87 engages the under surface of the guide rod 26, coöperating with the pulleys 84, so as to hold the carriage in position and to prevent vertical displacement. A pulley or roller 88 is journaled upon the pin 86 and is also similar to the pulleys 84 and 87, and engages the under surface of the guide rod 27. This pulley or roller 88, in addition to also preventing vertical movement of the carriage, prevents lateral movement of the carriage, and holds the carriage in perpendicular position with relation to the guide rods 26 and 27. It is obvious that when the larger needle 40 is employed, the opposing plates 80 and 81 may be further separated than at present illustrated, and in such an instance the rollers or pulleys 84, 87 and 88 may be dispensed with, and longer pulleys substituted. In other words, pulleys identical with those illustrated, but supplied with end bosses, such as shown at 89 in Fig. 27, may be provided for holding the plates 80 and 81 further spaced. A bumper block 90 is provided and it has a reduced portion 91 which is disposed between the two plates 80 and 81, there being a transverse bolt 92 extending through the plate and the block for securing the same securely in place, as well as holding the plates in their spaced relation. Secured to the plate 81 is a bracket 93. Mounted upon a stub screw or the like 94 (which is threaded into the bumper block 90) is a guide roller or pulley 95 provided with a beveled flange 96 on one end, preferably its upper end. Mounted in the bracket 93 is a stub bolt 97, on which a roller or pulley 98 is journaled. This pulley or roller 98 also has a beveled flange 99. The pulleys or rollers 95 and 98 are arranged at right angles to each other, the beveled flanges 96 and 99 overlapping the cylindrical portions of the rollers or pulleys respectively. It is clear that the pulleys or rollers 95 and 98 are disposed a little below and offset laterally from the needle, and after the wire 8 is inserted into the needle and bent, the exposed portion of the wire is inserted between the two rollers or pulleys 95 and 98, the overlapping flanges acting to hold the wire in the manner shown in Figs. 2, 3 and 9 clearly. The rollers or pulleys 95 and 98 act as a wire retainer or feed or guide, and further act as a let-out means for the wire as it is being fed and, as the needle rotates in the direction of the arrow $a$ in Fig. 9, the wire is coiled upon the exterior of the needle in a spiral helix, either with the convolutions of uniform diameters or in gradually increasing diameters, depending upon the type of needle used. Arranged between the plates 80 and 81 is a needle guide 100, which may be of any suitable construction, preferably as illustrated, and through the bore 101 of which the needle telescopically extends. This guide, on one face thereof, has a slight depression 102, to be engaged by the end of the shank of a set-screw 103 threaded through the plate 81. When employing the larger needle, the guide 100 may be removed, and in this case the needle passes between the two plates 80 and 81, and since the larger needle is reinforced by the intermediate needle, vibrations of the needles are prevented. Projecting laterally from the plate 80 is a projection 104, the purpose of which will appear in connection with the needle end retaining device. The lower ends of the plates 80 and 81 are bifurcated, as shown at 105, and secured therein, by means of the pins 106, is a dog 107, the nose 108 of which is designed to coöperate with the carriage detent mechanism to be hereinafter described. The tail-end of the dog has a lateral projecting headed pin 109, the purpose of which will likewise appear later. A loop 110 is slidably mounted on the dog, and is provided with an upwardly extending pin or lug 111 which projects through one of the links of the carriage operating sprocket chain 66, so that when the chain is operated, as previously set forth by power being imparted to the sprocket 57, the carriage will be moved on its guides in the direction of the arrow $b$, as shown in Fig. 3 of the drawings. The sprocket chain 66 passes over the flanged pulley 112, which may be journaled in any suitable manner, such as shown, in the lower parts of the arms of the bracket 25. Mounted upon the lower guide rod 27 is a buffer plate 113, and mounted in the bracket 25 are the guide bolts 114, which are provided with nuts 115. These bolts also pass through the buffer plate 113, there being cushioning springs 116 interposed between the buffer plate 113 and the bracket 25. It is obvious that on the return stroke of the carriage the bumper block contacts with the buffer plate, thereby absorbing the shock. The buffer plate 113 is angular in cross section and its flange 117 acts as a guard to prevent the wire from engagement between the buffer plate and the bracket 25. A suitable plate 118 is secured to a lateral projection 119 of the bracket 25, and threaded through the plate and partly into the lateral projection 119 is a stud rod 120. A guard rod 121 rises upwardly from one of the arms of the plate 21 and is bent at 122, whereby it may extend longitudinally of and in parallelism and adjacent the guide rods 26 and 27, but offset to one side thereof. The other end of the guard rod is bent to form an arch 123 arching over the guide rod 26 and has its eye 124 engaging the stud 120, there being nuts 125 upon opposite sides of the eye to retain the same and the guard firmly in position. This guard rod 121 is engaged by the wire from which the spiral reinforcement is being constructed, thereby holding the end of the wire in the position shown in Figs. 1, 2 and 3.

*Carriage return mechanism.*

After the carriage has made its forward movement it has been found desirable in the present instance to provide a positive return mechanism for the carriage. This mechanism comprises a conventional form of chain 126, one end of which is connected to an eye 127 of the dog 107, and its other end connected at 128 to the tensioned coiled spring 129. The spring 129 is, in turn, connected at 130 to the end piece 17, which supports the bed. This chain 126 also passes over the pulley 112, and over an additional pulley 131 which is carried by the under surface of the bed near the end piece 17. It is apparent that the chain 126 is arranged in a pair of loops, one of which engages said pulleys 112 and 131, the other engaging a pulley 132 which is connected to a second tensioned coiled spring 133. One end of the spring 133 is connected to a hook 134 which is carried by the end piece 16. When the carriage is making its reinforcement forming stroke, a pulling action is imparted on the chain 126, thereby tensioning both springs 129 and 133 simultaneously, and the actions of these springs are of such character, one equalizing the other, in order to relieve the excessive strain on the chain 66 and its coöperating parts. As soon as the carriage reaches the end of its reinforcement forming stroke, the clutch mechanism of the shaft 50 is opened automatically, and, through the tensioning action of the springs 129 and 133, the carriage is returned to its initial position.

*Clutch releasing mechanism.*

The hub 58 of the sprocket 57 has an annular groove 135, to be engaged by the forks 136 of the lever 137. An arched plate 138 is bolted or otherwise secured to the arms 22 of the plate 21, and this plate 138 has a reduced portion 139, engaging between the legs of the arched bracket 23. Mounted upon the reduced portion 139 is an overhanging arm or member 140, between the overhanging part of which and the reduced portion the lever 137 is pivoted at 141. One end of the lever is provided with an upstanding pin 142. Pivoted on one end of the plate 138, by the screw stud 143, is a detent 144 provided with a notch 145, to be engaged by the upstanding pin 142, when the lever 137 is moved pivotally. By means of a leaf spring 146, secured in any suitable manner to one leg of the arched bracket 23, for instance, as shown at 147, and which engages the detent 144, said detent is held in contact with the upstanding pin 142. A rocking pin 148 is mounted in a bearing of the plate 138, and on its upper end a cam arm 149 is fixed and on its lower end a curved arm 150 is secured by means of the set screw 150ª. The forks of a connector or coupler 151 are pivotally connected, as at 152, to the end of the curved arm 150. The arm 149 engages one end of the lever 137, and when a pulling action is imparted upon the connector 151, thereby rocking the pin 148, the arm 149 will oscillate the lever 137 and throw the two clutch members of the shaft 50 into coöperation. Instantly revoluble movement is imparted to the sprocket 57 and, in turn, the chain 66 is actuated, the carriage then being started on its reinforcement forming stroke. When the carriage reaches the end of such stroke, the head of the pin 109 will contact with one edge of the detent 144, actuate the same against the action of the spring 146, in which case the pin 142 will disengage from the notch 145, and, through the action of the spring between the two clutch members, the clutch members are separated, the sprocket 57 then remaining idle. The carriage is then free to return to its initial position through the medium of the carriage return mechanism previously described.

*Carriage detent mechanism.*

Mounted upon the bed 18 adjacent the bracket 25 is a bracket plate 154, preferably of the design or construction shown in Fig. 5. This bracket plate has a vertical bore 155 for the reception of the pin 156, there being a collar 157 secured upon the pin. A coiled spring 158 surrounds the pin 156 and is interposed between the collar 157 and the collar 159 which rests on the bed, the opening 160 through the bed and through which the pin 156 extends being smaller than the bore 155. Therefore, the collar 159 will be supported in position. The lower end of the pin 156 has an eye 161. The upper end of the bracket plate 154 has a laterally extending bifurcation 162, in which a detent 163 is pivotally mounted upon the pin 164. The under face of the detent has a depression 165, to be engaged by the upper end of the pin 156, to hold the detent normally in position, shown in Figs. 5 and 6. One end edge of the detent 163 is provided with a semicircular notch 167, which receives the head of the dog 107, when the carriage reaches its initial position. When the carriage starts on its reinforcement forming stroke, the head 108 of the dog 107 gradually disengages from the notch 167, the pin 156 and the rocking pin 148 being simultaneously actuated, so that the detent 163 will be released at the same time that the clutch members are connected or thrown in clutch. This enables the carriage to be free to start on its reinforcement forming stroke at the requisite time when power is imparted to the chain 66 for moving the carriage. In order to accomplish the simultaneous actuation of the pin 156 and the pin 148, a cable 168 is connected to the eye 161, and a rod 169 is attached to the connector 151. A cable 170 is connected to the rod 169 and passes over the pulley 171. The two cables 168 and 170 are connected to the eye bolts 172, which are adjustably connected to the crosshead plate 173 by the nuts 174. The eye bolts may be easily adjusted by re-arranging the nuts, and depending from the crosshead plate is a hook 175, to which a cable 176 is connected. This cable 176 is, in turn, connected to the hook 177 of the foot lever 178, which is pivoted at 179 between the joist of the flooring, as shown clearly in Figs. 1 and 4. This foot lever is provided with a foot-engaging knob 180, which, when the foot lever is depressed, becomes partly countersunk in the floor boards. This foot knob is mounted upon the lever by means of the bolt 181, which is secured to the lever by the nut 182. Obviously, when pressure is applied upon the foot knob, depressing the lever 178, the detent 163 is released simultaneously with the closing of the clutch members, allowing the carriage to proceed on its reinforcement forming stroke, owing to the power being imparted to the chain 66 at the same time.

*Needle-end retaining mechanism.*

When using the needles 34 and 44, it has been found imperative to provide means for retaining the end of the needle concentrically with the mandrel, and to prevent vibration, since the needle rotates at a rapid speed. This means comprises a bracket 184, which consists of a plate 185 provided with a threaded extension 186 penetrating the stud rod 120, there being a nut 187 on the extension to hold the plate securely connected to the rod. This plate 185 is arched, as shown, so as to remain rigid with relation to the stud rod. To complete the bracket, forks 188 project from the plate 185, and are spaced, as shown; consequently, the bracket is substantially U-shaped. A needle-end retaining plate or element 189 is provided, and extending laterally from the upper and lower edges thereof are pins 190 engaging bearings in the forks 188. This needle-end retaining element has a circular opening 191, through which the end of the needle (that is, either the needle 34 or 44) partially extends, that is, after the needle has been threaded with a wire 8 to be formed into a coil or spiral. This retaining element has a crotch 192 provided with an eye 193, and also projecting from one end of the plate 189 is a curved arm 194, which, when the retaining element is positioned, as shown in Figs. 3 and 7, with the needle end protruding through the opening 191, contacts with the stud rod 120, so as to hold the retaining element in position, and whereby the needle end may revolve freely in the opening 191. A collar 195 is slidably mounted upon the stud rod 120 and is designed to be secured in adjusted positions by the set screw 196. The collar carries an eye 197, to which one end of a spring 198 is connected. The other end of the spring is connected to the eye 193, thereby holding the arm 194 in contact with the stud rod 120. By adjusting the collar 195, the tension of this spring may be increased or decreased, as may be found necessary for the proper operation of the retaining element, and to facilitate the construction of the reinforcement helices. It is obvious that when the carriage returns to its initial position, the bumper block 90 thereof will contact with the retaining element, operating the same sufficiently to disengage the opening 191 from the needle-end. It is to be noted that the crotch 192 is so constructed with relation to the pivot 190, that when the retaining element is moved or oscillated sufficiently, the spring 198 will contract on the other side of the pivot 190, so as to oscillate the retaining element entirely clear of the needle, as shown in dotted lines in Fig. 3. Owing to the construction of the crotch and the connections or arrangement of the spring 198, the spring will retain the retaining plate, either in engagement with the needle-end or out of engagement. When the retaining plate is moved entirely free of the needle and the carriage has reached the end of its movement toward its initial position, the curved extremity 199 of the arm 194 will engage the projection or plate 104 of the carriage, assisting in retaining the carriage in its initial position, even though the springs 129 and 133 are still under tension, and the dog 107 is in engagement with the detent 163. However, when the carriage starts on its reinforcement forming stroke, the projection 104 will coöperate with the extremity 199 of the arm 198, in such wise as to oscillate the retaining element 189 to its initial position with the opening 191 receiving the end of the needle, thereby preventing excessive vibration of the needle, which would otherwise be due to the rapid revolution thereof.

*Bundling or binding mechanism for the reinforcements.*

Mounted upon the longitudinally extending pieces 6 (which brace the uprights 5 of the auxiliary section 3) is a reinforcement binding mechanism, which comprises a plurality of guide members 200 having channel guides 201. Mounted in the channel guides are rack frames 202, arranged in pairs in each of the channel guides. Each rack frame is elongated and rectangular, as illustrated, and has an elongated opening 203. The lower wall of the opening of one rack frame of each pair is provided with rack teeth 204 and the upper wall of the opening of the other rack frame of each pair is also provided with rack teeth 204ᵃ. Mounted in a bearing 206 of the section 2 of the frame of the machine and in bearings 207 of the walls of the guides 200 is a driven shaft 208, which is provided with a plurality of pinions 209, so engaging the teeth of the rack frames that when the shaft 208 is rotated in one direction, the rack frames are moved slidably in their channel guides in planes toward each other. When the shaft 208 is rotated in the opposite direction, the rack frames are moved in planes in the opposite direction. Secured to and mounted upon the upper edges of the rack frames by means of screws 210 are complemental reinforcement binding jaws, which are arranged in opposing series. Each series consists of nests of jaws, one nest carried by each rack frame and comprising a base jaw 211 and two additional jaws 212 and 213. The base jaw is curved, as shown, and the jaws 212 and 213 are correspondingly constructed, so that one will fit within the other and the two will fit the base jaw. These binding jaws are disposed beneath the conventional form of hopper 214, through which the reinforcements or helices as they are discharged from the needle pass, and, subsequently, deposited between the jaws, as will be obvious from an examination of Fig. 1 together with Fig. 21. The reinforcements or helices as they are discharged and, subsequently, passing through the hopper, contact with the abutment 215, which is supported on the pieces 6 by the hooks 216. The ends of the reinforcements or helices contact with this abutment, so that the ends of the helices or reinforcements are even or flush, when formed into bundles by the jaws. After sufficient reinforcements are deposited between the jaws, the shaft 208 is rotated in the direction of the arrow $c$, moving the rack frames in planes toward each other, likewise moving the jaws, which will compact the reinforcements into small and tight bundles. The additional jaws 212 and 213 are secured by the screws 217 to the jaws 211. These screws also penetrate the upper parts of the rack frames. Large bundles of reinforcements may be compacted by the base jaws 211, and by using both of the additional jaws 212 and 213, as shown in Fig. 20, small bundles of reinforcements may be compacted. Intermediate bundles may be formed, by removing the jaws 213. Larger base jaws may be employed, if so desired, in which case additional complemental jaws may also be used, whereby the bundles may be varied in size. The base jaws 211 are provided with extensions 218, which act to guide the reinforcements to and between the jaws.

The driving shaft 219 of the motor 15 is provided with a pair of fast pulleys 220 and 221, the latter being grooved, as shown at 222. Mounted upon the driven shaft 208 are loose pulleys 223 and 224, the latter having a groove 225. Collars 224$^a$ and 223$^a$ are secured on the shaft 208 by means of the set pins or screws 224$^b$. These collars are located on the shaft 208 in positions in contact with the pulleys 223 and 225, in order to act as abutments to prevent movement of the pulleys 223 and 225. The pulley 224 is immediately under the pulley 221, the two being engaged by a round belt 226 which is twisted or crossed, as shown at 227. Engaging the pulleys 220 and 223 is a flat belt 228. The loose pulleys 223 and 224 have clutch hubs 229 and 230, and keyed upon the driven shaft 208 is a double clutch member 231, the clutch teeth 232 and 233 of which are designed to coöperate with the clutch teeth of the clutch members 229 and 230, as will be hereinafter obvious. The clutch member 231 has a groove 234 engaged by the forks 235 of the lever 236 which is pivoted at 237 to the longitudinally extending piece 6 of the main section 2 of the frame. An operating rod 238 having a handle 239 is mounted in a guide 240 and has its end pivoted at 241 to the lever 236. The handle 239 of the operating rod is arranged in close position to the bundling mechanism so that an operator when hand-tying the bundles of reinforcements, may operate the rod and shift the clutch member 231. Interposed between the clutch members 229, 230 and 231, as shown clearly in Fig. 23, are coiled springs 242, which surround the driven shaft 208. By means of these springs, the clutch member 231 is held in a neutral position, as shown in Fig. 23. It is obvious that when the clutch member 231 is moved toward the pulley 223 to engage the clutch member 229, the shaft 208 will be driven in the direction of the arrow $c$, moving the jaws in planes toward each other, thereby compacting the reinforcements. Mounted upon and rotatable with the driven shaft 208 is a ratchet 243, which is engaged by the pawl 244, so as to hold the compacting jaws in their positions moved toward each other, to hold the bundle compact while the same is tied. However, after tying the bundle by hand, the pawl may be disengaged from the ratchet by applying hand pressure on its handle 245, in which case the driven shaft 208 is free to rotate in the opposite direction. This opposite rotation of the shaft 208 may be accomplished by moving the operating rod 238, whereby the clutch member 231 may be shifted toward the pulley 224 in order to engage the clutch member 230. Since the belt 227 is crossed or twisted, the driven shaft 208 will operate in the direction of the arrow $c$, which will separate the jaws, then the bundle is free to be removed by swinging the abutment 215 to one side.

*Operation.*

To form the reinforcements or helices, a piece of wire of the proper gage is inserted into the hollow needle, the needle-end retaining device having been swung to one side. The wire is inserted until its end engages the butt end of the socket in the mandrel. The wire is then bent so as to engage the diametrically oppositely disposed slots 46 of the end of the needle. The bent portion of the wire is then disposed in engagement with the guard 121, as shown in Figs. 1, 2 and 3. Power is then furnished, from any suitable source, to the motor 15, and through the medium of the belt 31, revoluble movement is imparted to the mandrel, and, at the same time, foot pressure is applied to the lever 178, which will simultaneously release the detent 163 and operate the clutch lever 137, so that its pin 142 will be engaged by the notch 145 of the detent 144. The clutch members 55 and 59 will then engage, and, through the medium of the gears 52 and 73 and 74 and the sprocket 57 and the chain 66, the carriage will start upon its reinforcement-forming stroke, feeding out the wire, which is in engagement with the guide rollers or members 95 and 98. Since the needle is rotating at a speed consistent with the movement of the carriage, the wire 8 is coiled upon the outer circumference of the needle, in the manner shown in Figs. 1, 2 and 3. When the carriage reaches the end of its stroke, completing the reinforcement, the detent 144 is actuated, releasing the pin 142 and, through the medium of the expansion spring 65, the clutch members 55 and 59 are separated. It is obvious that the carriage immediately returns to its initial position through the medium of the carriage return mechanism, which includes the springs 129 and 133. The reinforcement or helix is discharged off the needle into the trough and thence into the compacting mechanism. The reinforcement leaves the needle immediately prior to the oscillating of the needle-end retaining mechanism, the retaining element 189 thereof having been subsequently swung to one side and freed of the needle, whereby the next and subsequent wires may be inserted into the needle. When forming tapering or conical reinforcements with the tapered needle 40 (such reinforcement being designated by the numeral 246, Fig. 22), the needle-end retaining device may be detached. In this instance the needle 40 is reinforced by the intermediate diameter of needles, as shown in Fig. 25. Fence wire fastening helices 247, as shown in Fig. 22, may be constructed by using one of the other needles, and this fastening helix is interlocked with the reinforcement helix, as shown at 248, and is designed to receive a fastening key 249, for holding the fence wires 250 in the manner shown in Fig. 22, and as set forth, illustrated and claimed in said co-pending application. As the reinforcements are constructed, they are counted, since as the carriage reaches the limit of its forming-stroke, one of the rollers or a part of the carriage engages the arm 251 of the counter 252, and as soon as the carriage proceeds on its return stroke the arm 251 is returned to its normal position by the spring 253, the counter having registered the forming-stroke. When the arm 251 is released, it is held in its normal position by the abutment lug 254.

The invention having been set forth, what is claimed as new and useful is:—

1. In a machine as set forth including a frame having guides, the combination with a driven mandrel, of a needle carried thereby and revoluble therewith and adapted to receive telescopically a wire to be formed into a reinforcement helix, a longitudinally movable carriage mounted in the guides of the frame for letting out and guiding a bent portion of the wire, whereby it may form a spiral on the exterior of the needle, and a retainer for the free extremity of the needle, the said retainer being disengageable from and laterally movable away from the extremity of the needle.

2. In a machine for the purpose indicated, the combination with a frame, of a mandrel mounted therein, a reinforcement-forming needle carried by and revoluble with the mandrel, a carriage for feeding a guide wire upon the needle, a carriage drive, and a detent mechanism for the carriage and operatively connected with the drive for operation in timed relation with the latter.

3. In a machine for the purpose indicated, the combination with a frame having guides, of a mandrel mounted therein, a reinforcement-forming needle carried by and rotatable with the mandrel, a carriage for feeding and guiding the wire upon the needle, anti-frictional means supporting the carriage upon the guides, and a detent mechanism for the carriage and operatively connected with the drive for operation in timed relation with the latter.

4. In a machine as set forth, the combination with a frame, of a mandrel mounted therein, a reinforcement-forming needle carried by and revoluble with the mandrel, a carriage for feeding and guiding the wire upon the needle, a unitary operating mechanism for the mandrel and the carriage, a detent mechanism to be engaged by a member on the carriage at the end of its stroke to release the carriage from the operating mechanism and permit its automatic return, means for returning the carriage to its initial position, and a detent-holding device for the carriage when it returns to its initial position.

5. In a machine as set forth, the combination with a frame, of a mandrel mounted therein, a reinforcement-forming needle carried by and revoluble with the mandrel, a carriage for feeding and guiding the wire upon the needle, a unitary operating mechanism for the mandrel and the carriage, a detent mechanism to be engaged by a member on the carriage at the end of its stroke to release the carriage from the operating mechanism and permit its automatic return, means for returning the carriage to its initial position, a detent-holding device for the carriage when it returns to its initial position, and manual means for simultaneously releasing the detent-holding means and putting the operating mechanism into action and actuating the detent for the operating means.

6. In a machine for the purpose set forth, the combination with a revoluble reinforcement-forming needle, of a needle end retaining device mounted for swinging movement into and out of engagement with the extremity of the needle.

7. In a machine for the purpose set forth, the combination with a revoluble helix-forming needle, of a wire carriage feed therefor, and a needle end retaining element automatically operable from the carriage to swing into and out of engagement with the end of the needle to leave the latter unobstructed on the end when applying thereto a reinforcement to be formed.

8. In a machine for the purpose set forth, the combination with a revoluble helix-forming needle, of a wire carriage feed therefor, a needle end retaining element engaging the extremity of the needle to prevent excessive vibrations thereof, and means carried by the element and actuable by the carriage to swing the element laterally away from the end of the needle.

9. In a machine as set forth, the combination with a revoluble helix-forming needle, of a movable carriage provided with means for feeding out the wire upon the needle, a retaining device for the end of the needle to prevent excessive vibrations, an abutment on the device and engageable with a part of the machine for holding the device in a true engagement with the needle-end, means on the carriage to strike the device to free it from the end of the needle, and means on the carriage engaged by the abutment for moving the device in engagement with the needle-end.

10. In a machine for the purpose indicated, the combination with a revoluble wire helix-forming needle, of a retaining element for the extremity of the needle, a single tensioning means serving the dual function of holding the element into or out of engagement with the end of the needle.

11. In a machine for the purpose set forth, the combination with a revoluble helix-forming needle, of a retaining element for the end of the needle, a single tensioning means holding the element either in or out of operative engagement with the end of the needle, a means for regulating the tension of said tensioning means.

12. In a machine as set forth, the combination with a revoluble helix-forming needle, of a retaining element for the end of the needle, tensioning means for the element, means for releasing the element from engagement with the needle against the action of the tensioning means, and means on the element to be engaged by the element actuating means for returning the element in engagement with the needle-end.

13. In a machine for the purpose described, the combination with a revoluble helix-forming needle, of a retaining element for the end of the needle mounted for swinging movement laterally away from the needle and a single means holding said element in and out of engagement with the needle.

14. In a machine for the purpose set forth, the combination with a revoluble helix-forming needle, of a pivotally mounted retaining element for the end of the needle, and a single tensioning means operable to hold said element either in or out of engagement with the end of the needle.

15. In a machine as set forth, the combination with a revoluble helix-forming needle, of a pivoted retaining element for the end of the needle, tensioning means for performing the dual functions of holding the element into and out of engagement with the end of the needle, a device for moving the element from engagement with the end of the needle, said element having means engaged by the device for returning the element into engagement with the needle end against the action of the tensioning means.

16. In a machine as set forth, the combination with a revoluble helix-forming needle, of a retaining element therefor, tensioning means for the element, means for actuating the element for releasing the end of the needle, whereby the helix may be discharged from the needle, and a detent for the element-actuating means.

17. In a machine as set forth, the combination with a revoluble helix-forming needle, of a retaining element for the needle-end, means for actuating the element at the completion of the construction of the helix to remove it from the end of the needle, and a mechanism for buffing said means before said means engages the element.

18. In a machine as set forth, the combination with a revoluble helix-forming needle, of a pivoted retaining element for the end of the needle, means for actuating the element upon completing the formation of the helix, a buffer device for said means, and a detent for the means to prevent the recoil thereof incident to engaging the buffer means.

19. In a machine as set forth, the combination with a revoluble helix-forming needle, of a retaining element for the end thereof, tensioning means for holding the element in and out of engagement with the end of the needle, reciprocating means for letting out the wire onto the needle and for actuating the element on the return of said reciprocating mechanism to its initial position upon completing the formation of the helix on the needle against the action of the tensioning means, said element having an arm, and means carried by the reciprocating mechanism to be engaged by the arm for returning the element into engagement with the end of the needle.

20. In a machine as set forth, the combination with a revoluble helix-forming needle, of a retaining element for the end thereof, tensioning means for holding the element in and out of engagement with the end of the needle, reciprocating means for letting out the wire onto the needle and for actuating the element on the return of said reciprocating mechanism to its initial position upon completing the formation of the helix on the needle against the action of the tensioning means, said element having an arm, and means carried by the reciprocating mechanism to be engaged by the arm for returning the element into engagement with the end of the needle, and a buffer device for the reciprocating means.

21. In a machine as set forth, the combination with a revoluble helix-forming needle, of a retaining element for the end thereof, tensioning means for holding the element in and out of engagement with the end of the needle, reciprocating means for letting out the wire onto the needle and for actuating the element on the return of said reciprocating mechanism to its initial position upon completing the formation of the helix on the needle against the action of the tensioning means, said element having an arm, means carried by the reciprocating mechanism to be engaged by the arm for returning the element into engagement with the end of the needle, a buffer device for the reciprocating means, and a detent mechanism for the reciprocating means to prevent the recoil incident to contacting with the buffer device.

22. In a machine for the purpose set forth, a rotary mandrel, a plurality of reinforcement-forming needles, and means for mounting them individually or together upon the mandrel.

23. In a machine for the purpose set forth, a revoluble mandrel, a plurality of reinforcement-forming needles, and means for connecting one or all to the mandrel so that one may reinforce the other.

24. In a machine for the purpose set forth, a revoluble mandrel, a plurality of reinforcement-forming needles, and means for connecting the same to the mandrel in telescopic relation.

25. The combination with a revoluble mandrel, of a pair of needles telescopically united, means for connecting one of the needles to the exterior of the mandrel, and means for connecting the other needle to the interior of the mandrel.

26. The combination with a tubular revoluble mandrel provided with exterior threads, a pair of needles telescopically united, one connected to the exterior threads, and means passing transversely of the first needle and the mandrel for holding the other needle within the mandrel.

27. The combination with a revoluble needle, of a supporting mandrel therefor, guide rods disposed above and below the needle, a carriage swung between the guides, and a guide on the carriage in surrounding relation to and movable longitudinally along the needle.

28. The combination with a revoluble needle, of a supporting mandrel therefor, guides disposed above and below the needle and paralleling the same, a carriage swung between the guides and provided with antifrictional means engaging the same, and a support on the carriage in surrounding relation to the needle and longitudinally movable along the same to offset lateral strains on the needle.

29. The combination with a revoluble needle of a supporting mandrel therefor, guide rods disposed above and below the needle and paralleling the same, a carriage swung between the guide rods and provided with means in surrounding relation to and longitudinally movable along the needle to offset lateral strains thereon, and anti-frictional means on the carriage through which the wire is fed upon the needle.

30. The combination with a revoluble needle of a supporting mandrel therefor, a frame by which the mandrel is supported, a carriage carried by and longitudinally movable in the frame, and wire let-out rolls mounted on the carriage and between which wire is fed to the needle.

31. The combination with a revoluble needle, of a supporting mandrel therefor, guides disposed above and below the mandrel, a carriage swung between the guides and movable in the direction of the length of the needle, and wire let-out rolls mounted on the carriage and having their axes of rotation disposed at angles to each other.

32. The combination with a revoluble needle, of a supporting mandrel therefor, a frame by which the mandrel is carried, guide rods carried by the frame and disposed above and below the needle, a carriage swung between the guides and movable in the direction of the length of the needle, and flanged wire let-out rolls rotatably mounted on the carriage with their axes of rotation disposed at different angles.

33. The combination with a revoluble needle, of a supporting mandrel therefor, a frame by which the mandrel is carried, guide rods carried by the frame and disposed above and below the needle, a carriage swung between the guides and movable in the direction of the length of the needle, and flanged wire let-out rolls rotatably mounted on the carriage with their axes of rotation disposed respectively in vertical and horizontal planes.

34. The combination with a revoluble needle, of a supporting mandrel therefor, a frame by which the mandrel is carried, guide rods carried by the frame and disposed above and below the needle, a carriage swung between the guides and movable in the direction of the length of the needle, and flanged wire let-out rolls rotatably mounted on the carriage with their axes of rotation disposed at different angles and provided with flanges disposed in overlapping relation.

35. The combination with a revoluble needle, of a supporting mandrel therefor, a frame by which the mandrel is carried, guide rods carried by the frame and disposed above and below the needle, a carriage swung between the guides and movable in the direction of the length of the needle, and flanged wire let-out rolls rotatably mounted on the carriage with their axes of rotation disposed at different angles and provided with beveled flanges disposed in overlapping relation, each flange overlapping the opposite roll.

36. The combination with a revoluble tubular needle adapted to receive therein a portion of the roll of a reinforcement to be formed, of means for rotating the needle, spaced parallel guide rods paralleling and disposed respectively above and below the needle, a reciprocating device swung between the guide rods to travel in the direction of the needle, and means for operating said device, the extremity of the needle having diametrically disposed slots formed therein into which the wire may be engaged to prevent its turning when being wound on the needle.

37. The combination with a revoluble tubular needle adapted to receive a portion of the roll of a reinforcement to be formed, means for rotating the needle, parallel guide rods disposed respectively above and below the needle and paralleling the same, a reciprocating device swung between the guide rods and anti-frictionally mounted on the same and provided with let-out means for feeding the remaining portion of the wire to the exterior of the needle, and an endless drive chain for the reciprocating device and means for intermittently operating the same.

38. The combination with a revoluble tubular needle to receive a portion of the wire of a reinforcement to be formed, of means for rotating the needle, spaced parallel guide rods disposed respectively above and below the needle and paralleling the same, a reciprocating device spanning and anti-frictionally engaging the guide rods and provided with wire let-out means for winding the remaining portion of the wire on the needle, and a guard for the said remaining portion of the wire to prevent vibration of the same during the winding operation.

39. The combination with a revoluble tubular needle to receive a portion of the wire of a reinforcement to be formed, of a drive for the needle, spaced parallel guide rods paralleling and disposed respectively above and below the needle, a reciprocating device spanning and anti-frictionally connected with the guides and provided with let-out means for feeding the remaining portion of the wire on to the exterior of the needle, the needle having means to prevent relative turning movement between itself and that portion of the wire contained within, and a guard for the said remaining portion of the wire to prevent vibration of the same during the winding operation.

40. The combination with a revoluble tubular needle adapted to receive a portion of the wire of a reinforcement to be formed, of means for rotating the needle, spaced parallel guides paralleling and disposed respectively above and below the needle, a reciprocating device carried by the guides and provided with let-out means for feeding the remaining portion of the wire on to the exterior of the needle, and endless operating means for said device, means intermittently connecting the endless operating means with the said device and a tensioned return for the device.

41. The combination with a revoluble tubular needle for the reception of a portion of a wire, of operating means for the needle, a reciprocating device for letting out and feeding the other portion of the wire on the exterior of the needle, reciprocating means connected to the device, foot operated means connecting said reciprocating and operating means intermittently whereby the carriage is moved in one direction, and means put under tension thereby for returning the device to its initial position.

42. The combination with a tubular revoluble needle and its operating means, spaced guide rods disposed respectively above and below the needle and paralleling the same, a carriage swung between the guide rods and provided with means in surrounding relation to the needle whereby lateral strains on the latter are offset, and anti-friction let-out means mounted on the carriage.

43. The combination with a tubular revoluble needle and its operating means, spaced parallel guide rods disposed respectively above and below the needle, a carriage anti-frictionally engaging the guide rods and provided with a needle guide in surrounding relation to the needle to offset lateral strains on the latter, and a pair of wire let-out rolls mounted on the carriage to the rear of the needle guide and adapted to coil a wire on the exterior of the needle.

44. The combination with a tubular revoluble needle, of operating means therefor, the said needle being adapted to receive within itself a portion of the wire of a reinforcement to be formed, of spaced parallel guide rods disposed respectively above and below the needle and paralleling the same, a carriage mounted on the guide rods and provided with a needle guide in surrounding relation to the needle, and a pair of wire let-out rolls mounted on the carriage to the rear of the needle guide and adapted to coil the remaining portion of the wire on the exterior of the needle.

45. The combination with a revoluble tubular needle to telescopically receive a portion of a wire to form the central part of a reinforcement, a reciprocating device, and means on the device comprising flanged rollers at right angles to each other for letting out and feeding the other portion of the wire spirally on the needle.

46. The combination with a revoluble tubular needle to telescopically receive a portion of a wire to form the central part of a reinforcement, a reciprocating device, means on the device comprising flanged rollers at right angles to each other for letting out and feeding the other portion of the wire spirally on the needle, and a guard for the other portion of the wire to prevent vibration as it spirals on the needle.

47. The combination with a revoluble tubular needle to telescopically receive a portion of a wire to form the central part of a reinforcement, a reciprocating device, means on the device comprising flanged rollers at right angles to each other for letting out and feeding the other portion of the wire spirally on the needle, a guard for the other portion of the wire to prevent vibration as it spirals on the needle, and means at the end of the needle to prevent turning of the wire therein.

48. In a machine for the purpose indicated and including a frame having guides, the combination with a driven mandrel carrying a needle to telescopically receive a portion of the wire of a reinforcement to be formed, of a carriage mounted on the guides and movable in the direction of the length of the needle and provided with a pair of anti-friction let-out rolls for guiding the remaining portion of the wire on the needle to form a helix, mechanism for operating the mandrel, means to reciprocate the carriage, foot operating means connecting the operating mechanism and the first means whereby the first means may be thrown into gear with said mechanism and carriage actuated means to disconnect the foot operating means.

49. In a machine for the purpose indicated and including a frame having guides, the combination with a driven mandrel carrying a needle to telescopically receive a portion of the wire of a reinforcement to be formed, of a carriage mounted on the guides and movable in the direction of the length of the needle and provided with a pair of let-out rolls for guiding the remaining portion of the roll onto the needle to form a helix, operating mechanism for the mandrel, means to reciprocate the carriage, and a foot controlled clutch connecting the carriage reciprocating means with the operating mechanism, the said clutch being carriage operated for its release.

50. In a machine for the purpose indicated and including a frame having guides, the combination with a driven mandrel having a needle, of mechanism for rotating the mandrel, a carriage supported on the guides and movable in the direction of the length of the needle and provided with wire let-out rolls for guiding the wire on to the exterior of the needle in the form of a helix, means actuated by the rotating mechanism for moving the carriage in one direction, a foot controlled clutch operatively connecting said means with the rotating mechanism, and a carriage controlled release for said clutch.

51. In a machine for the purpose indicated and including a frame having guides, the combination with a driven mandrel having a needle, of mechanism for rotating the mandrel, a carriage mounted upon the guides and movable in the direction of the length of the needle and provided with a pair of wire let-out rolls for winding wire on to the exterior of the needle in the form of a helix, means for moving the carriage in both directions in the direction of the length of the needle, a clutch controlled connection between said means and a rotating mechanism, a foot operated pedal for the clutch and a carriage controlled release for the same.

52. In a machine for the purpose described a frame provided with guides and supporting a mandrel to be driven, a reinforcement forming needle carried by the mandrel, a reciprocatory carriage traversing the needle and wire let-out members supported by the carriage and embracing and guiding the wire upon the exterior of the needle to form a helix of the wire.

53. In a machine for the purpose described, a rotary mandrel and needle therefor, a carriage mounted to traverse the needle, and a plurality of revoluble members having their axes disposed at angles to each other so that they may completely embrace the wire to guide the same on the needle to form a helix of the wire.

54. In a machine of the kind set forth, a revoluble reinforcement forming needle, a carriage traversing the needle and provided with a guide to offset lateral strains on the needle, and revoluble wire let-out means mounted on the carriage and embracing a wire to wind the same on the needle in the form of a helix.

55. In a machine for the purpose set forth, a driven mandrel carrying a needle, a carriage traversing the needle in the direction of its length, and flanged wire let-out rolls disposed to have their flanges and their main portions coöperate to surround a wire being wound on the needle.

56. In a machine for the purpose set forth, a driven mandrel and reinforcement forming needle therefor, a carriage, guides on which the carriage is mounted to traverse the needle in the direction of its length, and opposed rolls forming with flanges so as to completely surround a wire being wound upon the needle.

57. In a machine of the kind set forth, a mandrel and needle by which the mandrel is carried, means for rotating the mandrel, a carriage, guides supporting the carriage so that the same may traverse the needle in the direction of its length, anti-frictional means supporting the carriage upon the guides, and opposed flanged rollers disposed so as to completely surround a wire being wound upon the needle.

58. In a machine as set forth, a driven mandrel carrying a needle, a carriage, guides therefor, means for anti-frictionally mounting the carriage on the guides, opposing means at right angles to each other on the carriage and rendered revoluble due to the action of a wire passing therebetween for feeding the wire helically on the needle, and means on the carriage through which the needle passes to prevent excessive vibrations of the needle.

59. In a machine for the purpose set forth, a revoluble reinforcement forming needle, a retaining element for one extremity of the latter and mounted to swing laterally into and out of engagement with said extremity and a single resilient means, functioning means to hold said element either into or out of engagement with the needle end.

60. In a machine as set forth, a revolubly driven helix forming needle, a retaining element for the needle end, means for holding the element into and out of engagement with the needle end, means to actuate the element to engage and disengage it with and from the needle, and additional means for cushioning said element actuating means.

In witness whereof, in the presence of two witnesses, the inventor's signature is hereunto affixed.

ARCHIBALD McPHAIL.

Witnesses:
Thos. H. Unsworth,
Robert A. Boswell.